United States Patent
Irzyk

(10) Patent No.: US 10,042,170 B2
(45) Date of Patent: Aug. 7, 2018

(54) METHOD AND DEVICE FOR DETECTING THE POSITION OF THE FACE OF A PERSON, IN PARTICULAR OF A MOTOR VEHICLE DRIVER, AND DISPLAY INCLUDING SUCH A DEVICE

(71) Applicant: VALEO COMFORT AND DRIVING ASSISTANCE, Creteil (FR)

(72) Inventor: Michael Irzyk, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 104 days.

(21) Appl. No.: 14/904,182

(22) PCT Filed: Jun. 30, 2014

(86) PCT No.: PCT/FR2014/000154
§ 371 (c)(1),
(2) Date: Jan. 11, 2016

(87) PCT Pub. No.: WO2015/004338
PCT Pub. Date: Jan. 15, 2015

(65) Prior Publication Data
US 2016/0139415 A1  May 19, 2016

(30) Foreign Application Priority Data

Jul. 12, 2013  (FR) ..................................... 13 01656

(51) Int. Cl.
*G01J 5/02* (2006.01)
*G02B 27/01* (2006.01)
(Continued)

(52) U.S. Cl.
CPC ........ *G02B 27/0179* (2013.01); *G01J 5/0025* (2013.01); *G01J 5/14* (2013.01);
(Continued)

(58) Field of Classification Search
CPC .......................... G02B 27/0179; G01S 17/026
(Continued)

(56) References Cited

U.S. PATENT DOCUMENTS

| | | | |
|---|---|---|---|
| 5,335,308 A * | 8/1994 | Sorensen .................. | F26B 3/30 250/491.1 |
| 2005/0211903 A1* | 9/2005 | Harter, Jr. .............. | B60Q 9/008 250/353 |
| 2015/0293012 A1* | 10/2015 | Rapoport ............... | G01N 21/03 435/288.7 |

FOREIGN PATENT DOCUMENTS

| | | |
|---|---|---|
| DE | 198 22 850 A1 | 11/1998 |
| DE | 10 2010 040694 A1 | 3/2012 |

OTHER PUBLICATIONS

English Translation of DE19822850A1.*
(Continued)

*Primary Examiner* — David Porta
*Assistant Examiner* — Abra Fein
(74) *Attorney, Agent, or Firm* — Osha Liang LLP

(57) ABSTRACT

The invention relates to a device (1) for detecting the position of the face (2) of a person, in particular of a motor vehicle driver, wherein said device includes:
a thermal sensor (4) configured for determining the heat generated from a target area (6) likely to be occupied by a person, in the form of a dot (10) matrix (8), each dot (10) in said matrix (8) representing the heat generated by a portion of said target area (6),
processing means for analyzing a value acquired through a physical quantity for the dots (10) of said matrix (8) in order to detect at least one piece of adjustment information (12) that is representative of the position of said face (2) within said target area (6).

(Continued)

The invention also relates to a corresponding detection method and display, in particular a head-up display, provided with said device.

15 Claims, 2 Drawing Sheets

(51) Int. Cl.
*G01S 17/02* (2006.01)
*G06F 3/01* (2006.01)
*G02B 27/00* (2006.01)
*H04N 5/232* (2006.01)
*G01J 5/00* (2006.01)
*G01J 5/14* (2006.01)
*H04N 5/33* (2006.01)

(52) U.S. Cl.
CPC ........ *G01S 17/026* (2013.01); *G02B 27/0093* (2013.01); *G02B 27/01* (2013.01); *G02B 27/0101* (2013.01); *G06F 3/012* (2013.01); *H04N 5/23229* (2013.01); *G02B 2027/014* (2013.01); *G02B 2027/0187* (2013.01); *H04N 5/33* (2013.01)

(58) Field of Classification Search
USPC ....................................................... 250/342
See application file for complete search history.

(56) References Cited

OTHER PUBLICATIONS

English Translation of DE102010040694A1.*
International Search Report issued in corresponding application No. PCT/FR2014/000154 dated Sep. 29, 2014 (4 pages).

* cited by examiner

METHOD AND DEVICE FOR DETECTING THE POSITION OF THE FACE OF A PERSON, IN PARTICULAR OF A MOTOR VEHICLE DRIVER, AND DISPLAY INCLUDING SUCH A DEVICE

The invention relates to a system and a method for detecting the position of the face of a person, in particular of a motor vehicle driver, and to a display, in particular a head-up display, including such a device.

As is known, a motor vehicle may be equipped with a head-up display system.

Such a head-up system includes, as is known, an image generation device, also called an imager, which produces a real image, and an optical system responsible for creating a virtual image outside of the vehicle, in the driver's field of vision, from this real image. However, the known displays have the disadvantage of offering a small angle of viewing of the image projected, for example more or less 3°. It is therefore important that the image projected is correctly positioned in the driver's field of vision so that the latter can see it.

Furthermore, as is known, vehicles are generally provided with driver position adjustment means giving the driver a greater range of options as regards his position, in particular his vertical position.

There is therefore the risk that the driver might choose a comfortable position in which he does not see the image projected by the display.

To overcome this problem, it has been proposed to adapt the position of the projected image to the position of the driver. The known solutions provide for the use of a camera for acquiring an image of the driver. Said image is then processed to determine the vertical position of the driver's head. The location of the projected image is adjusted accordingly.

However, such solutions have drawbacks. In particular, they require that the driver be illuminated, preferably using an infrared light.

The invention aims to improve the situation and to this end proposes a device for detecting the position of the face of a person, in particular of a motor vehicle driver, said device including:
  a thermal sensor configured for determining the heat generated from a target area likely to be occupied by the person, in the form of a dot matrix, each dot of said matrix representing the heat generated by a portion of said target area,
  processing means for analyzing a value acquired through a physical quantity for the dots of said matrix in order to detect at least one piece of adjustment information that is representative of the position of said face within said target area.

Thus, it is not an image of the scene that is created but a simple thermal map. The temperature of the face of a person is distinguished from that of the surrounding environment, which is different. By identifying the hottest area of the map, it is thus possible deduce, from the position of said area in the map, the required information, namely the position of the person's face. Such a solution dispenses with the need to illuminate the scene.

According to various embodiments of the invention, which may be taken alone or in combination:
  said matrix comprises n rows and m columns defining n×m dots, n and/or m being strictly greater than 1 and less than or equal to 128,
  n and/or m are equal to 8 or 16,
  said thermal sensor is configured to be sensitive to radiation having a wavelength in the far infrared,
  said thermal sensor is configured to be sensitive to radiation having a wavelength of between 2 and 22 micrometers, preferably between 2 and 12 micrometers,
  said sensor is a thermopile,
  said sensor comprises a lens.

With such features, especially with such a limited number of dots, it is clear that the means to be used, in particular the processing means, are much more limited than with conventional video signals for which the images can be as high as 640×480 dots so as to successfully detect a face.

The invention also relates to a display, in particular a head-up display, said display being configured to display a virtual image at a given height, called the display height, said display including a device for detecting the position of the face as mentioned above.

According to various embodiments of the invention, which may be taken alone or in combination:
  said display comprises means for changing said display height,
  said processing means is configured to actuate said means for changing the display height, as a function of said adjustment information,
  said display comprises an optical system for transmitting rays for displaying said virtual image and said means for changing the display height comprises at least one component, called a movable component, of said optical system,
  said movable component is a mirror and/or a semi-reflective plate,
  said thermal sensor has a given resolution and said processing means is configured to actuate said movable component during a step of determining said adjustment value, so as to increase said resolution,
  said thermal sensor is positioned and said optical system is configured so that said rays follow an optical path which is different to a trajectory followed by the radiation received by said sensor from said person,
  said display comprises an optical element for changing the optical path followed by said rays while leaving unchanged a trajectory followed by the radiation received by said sensor from said person,
  said optical element is a component of said optical system,
  said optical element is said movable optical component,
  said optical element is a dichroic mirror,
  the display includes an image generation device, in particular provided with one or more laser light sources.

The invention also relates to a method for detecting the position of the face of a person, in particular of a motor vehicle driver, said method including:
  a step of determining the heat generated from a target area likely to be occupied by the person, in the form of a dot matrix, each dot of said matrix representing the heat generated by a portion of said target area,
  a step of analyzing a value acquired through a physical quantity for the dots of said matrix in order to detect at least one piece of adjustment information that is representative of the position of said face within said target area.

Said method may in particular be implemented by the detection device described above.

Other features, details and advantages of the invention will emerge more clearly on reading the description given below by way of indication in relation to the drawings, in which.

Figure 1:
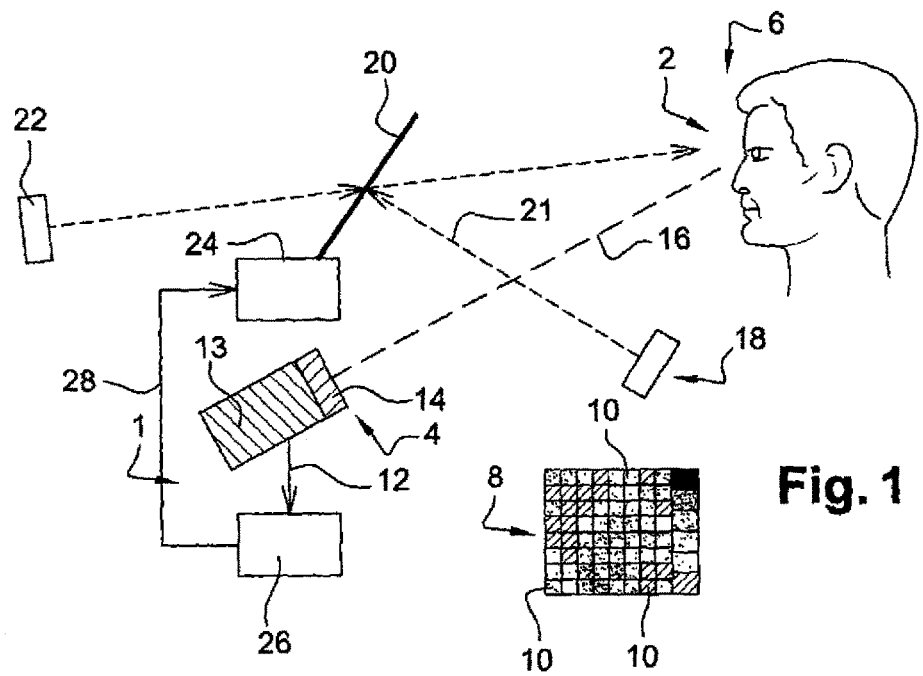
FIG. 1 is a schematic view of a first example of a head-up display provided with a detection device according to the invention.

As shown in FIG. 1, the invention relates firstly to a device 1 for detecting the position of the face 2 of a person, in particular a motor vehicle driver.

Said device comprises a thermal sensor 4, configured for determining the heat generated from a target area 6 likely to be occupied by the person. This is, for example, an area taking into account the possible differences in size and in positioning for the person, in particular as a function of the adjustment range of the seat on which said person is sitting in the case of use by vehicle drivers.

Said thermal sensor materializes the information captured in the form of a dot 10 matrix 8, each dot 10 in said matrix representing the heat generated by a portion of said target area 6. In this case, it may be seen that the dots at the bottom center of the matrix are those corresponding to the hottest part of said area 6. The face 2 of the user may thus be considered to be in this portion of the area. In other words, according to the invention, a thermal map of the area 6 has thus been created. The information required is therefore obtained without having to illuminate the scene.

However, contrary to what is suggested in FIG. 1, said device does not necessarily comprise a display medium for said matrix. It is sufficient that it comprises processing means for analyzing a value acquired through a physical quantity for the dots 10 in said matrix 8. For example, said sensor 4 converts the information concerning the heat generated by each portion of the area 6 corresponding to a given dot 10 in said matrix 8 in the form of an electric current and it is then the analysis of the value acquired through said current for each dot 10 which is performed, in particular in the form of a comparison between the various values measured, to deduce therefrom the dots 10 in the matrix which are characteristic of the information required, namely the position of the face.

Having established the latter, said processing means then make it possible to detect at least one piece of information 12 that is representative of the position of said face 2 inside said target area 6. Said information is hereinafter referred to as adjustment information. Indeed, as explained below, said information may in particular be used to adjust various systems for which the position of the face is relevant information. Said adjustment information may be either analog or digital.

If n is the number of rows and m is the number of columns in the matrix 8, such that said matrix 8 comprises n×m dots 10, then n and/or m are, for example, strictly greater than 1 and less than or equal to 128. With these values a compromise is obtained, minimizing the computing means to be used while having sufficient resolution to allow the desired positioning accuracy. As an advantageous example, n and/or m are equal to 8 or 16. Said matrix may therefore, in particular, have 64 or 256 dots 10.

Said thermal sensor 4 is configured to be sensitive, for example, to radiation having a wavelength in the far infrared. This is a range of radiation which is representative of heat from a face. More specifically, said thermal sensor 4 is configured to be sensitive to radiation having a wavelength of between 2 and 22 micrometers, preferably between 2 and 12 micrometers. Said sensor 4 is, for example, a thermopile.

Said sensor may comprise a measuring body 13 and a lens 14 transmitting the incident radiation 16 to the measuring body 13. Said processing means may be located in said measuring body 13.

As shown in FIGS. 1 to 5, said detection device may first be used with a display, in particular a head-up display, especially for a vehicle.

The invention thus also relates to a display configured to display a virtual image 22 at a given height, called the display height, said display including a device 1 for detecting the position of the face as described above.

Said display includes, for example, an image generation device 18 such as, in particular, a liquid crystal screen or a scanning image generator using a laser light source. It may further include an optical system for transmitting rays 21 for displaying said virtual image 22 beyond the windshield. Said optical system in this case comprises a semi-reflective plate 20, also known as a combiner.

Said display further comprises means 24 for modifying said display height. This is, for example, a mechanical actuator acting on the orientation of the rays 21 for transmission of said image, by means of one of the components, called movable components, of said optical system of the display.

Said processing means of the control device is advantageously configured to actuate said means 24 for changing the display height, in accordance with said adjustment information 12. In this regard, said display in this case comprises a processing unit 26. Said processing unit 26 is configured to receive said adjustment information 12 and transmit it to said means 24 for changing the height of the image, in the form of an actuation signal 28.

Said movable optical component is, for example, said semi-reflective plate, the orientation of which may be adjusted using the means 24 for changing said display height.

As shown in FIGS. 2 to 5, in an alternative embodiment, it may also be a mirror 30 reflecting the rays transmitted between the image generation device 18 and the semi-reflective plate 20.

Figure 2:
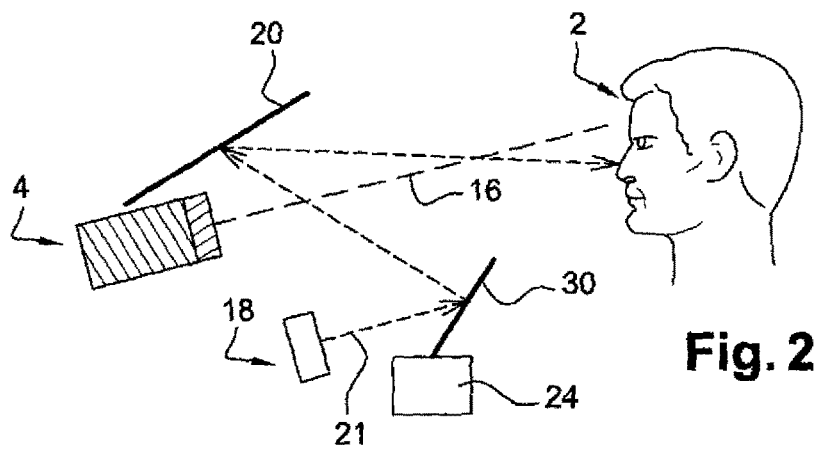
FIG. 2 is a schematic view of a second example of a head-up display provided with a detection device according to the invention.

According to the embodiment of FIGS. 1 and 2, said thermal sensor 4 is positioned and said optical system is configured so that said rays 21 follow an optical path which is different to a trajectory followed by the radiation 16 received by said sensor from said person. In FIG. 2, said sensor 4 is located at the foot of said semi-reflective 20.

Figure 3:
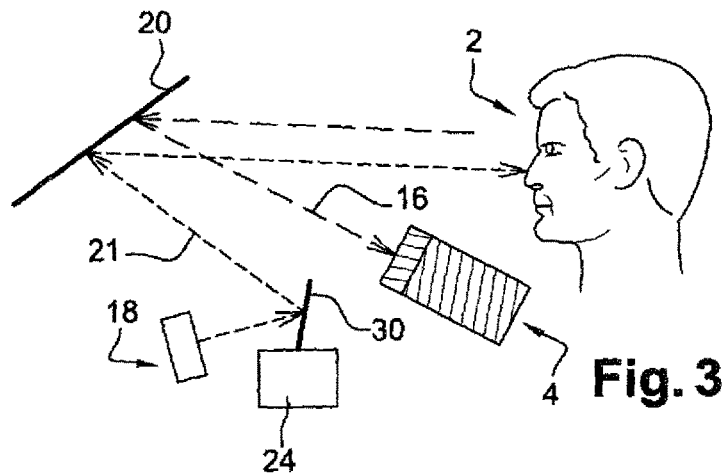
FIG. 3 is a schematic view of a third example of a head-up display provided with a detection device according to the invention.
Figure 4:
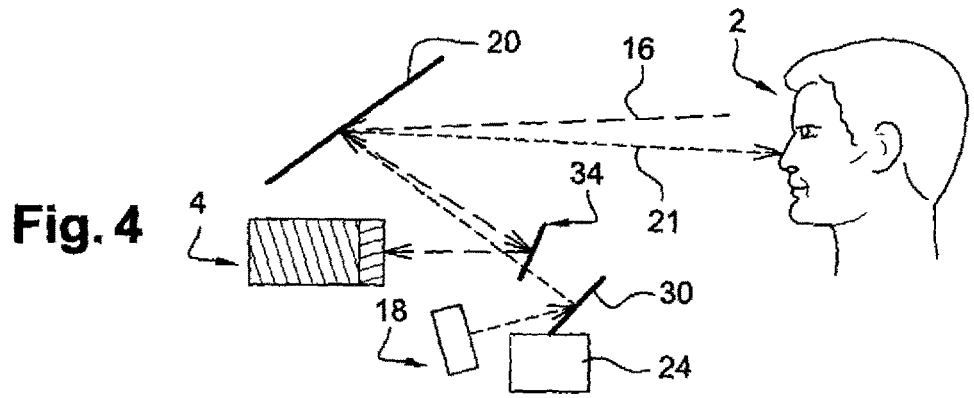
FIG. 4 is a schematic view of a fourth example of a head-up display provided with a detection device according to the invention.
Figure 5:
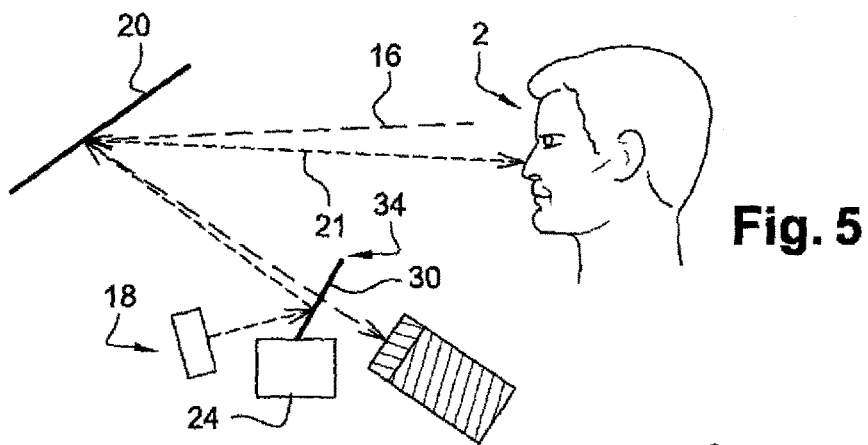
FIG. 5 is a schematic view of a fifth example of a head-up display provided with a detection device according to the invention.

According to the embodiment of FIGS. 3 to 5, said rays 21 and said radiation 16 partly follow the same pathway. In other words, said thermal sensor 4 is positioned so that the or one of the components of the optical system of the display serve to transmit the radiation 16 to said sensor 4. In this instance, it is said semi-reflective plate 20.

In FIGS. 4 and 5, said display further comprises an optical element 34 for changing the optical path followed by said rays 21 while leaving unchanged a trajectory followed by the radiation 16 received by said sensor from said person, or vice versa.

In FIG. 4, said optical element 34 is an additional component. In FIG. 5, it is one of the components of said optical system, more specifically the movable optical component 30, which in this case may be a dichroic mirror.

That being so, to improve the resolution of the sensor, said processing means may be configured to actuate said movable component 20, 30 during a step of determining said adjustment value, so as to increase said resolution. Indeed, by using a sort of scanning effect, several matrices 8 are obtained, each matrix corresponding to a given position of the movable component 20, 30. The number of points of measurement is thus multiplied without the need for a more sophisticated sensor.

Alternatively, the same result of increased resolution may be achieved by making said sensor 4 itself or the optical element 34 movable. In the configuration of FIG. 2, it can be seen that the chosen arrangement makes it possible to use the same actuator to orient said semi-reflective plate 20, for example for retracting the latter, and said sensor 4, in view of their proximity.

Figure 6:
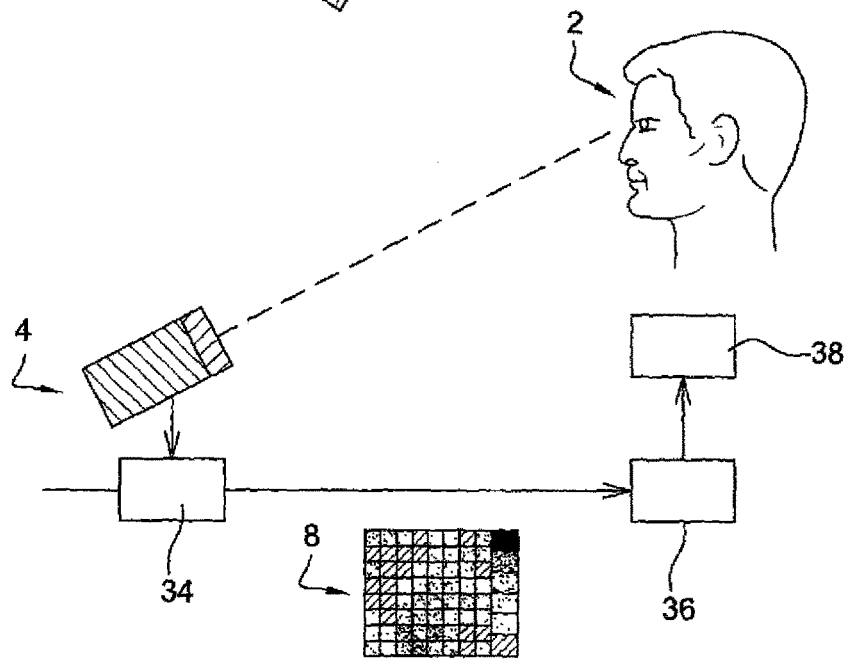
FIG. 6 is a schematic view of another use of a detection device according to the invention.

As shown in FIG. 6, said detection device may also be used with an air conditioning system, in particular for a vehicle.

Said system thus includes said sensor 4 and said processing means, in this case represented by the functional block 34. It also comprises a processing unit 36 connected to a component 38 of said air conditioning system of which the position and/or operation depends on the position of the height of the person 2 located in the passenger compartment air-conditioned by said air conditioning system.

The invention also relates to a method for detecting the position of the face of a person 2, in particular a motor vehicle driver, corresponding in particular to the use of the detection device described above.

Said method thus includes at least:
a step of determining the heat generated from a target area 6 likely to be occupied by the person, in the form of a dot 10 matrix 8, each dot 10 in said matrix 8 representing the heat generated by a portion of said target area 6,
a step of analyzing a value acquired through a physical quantity for the dots of said matrix in order to detect at least one piece of adjustment information that is representative of the position of said face within said target area.

The invention claimed is:

1. A device for detecting a position of a face of a motor vehicle driver, said device comprising:
a thermal sensor stationery with respect to a target area configured to be occupied by the motor vehicle driver, wherein the thermal sensor is configured for determining heat generated from the target area in a form of a dot matrix, each dot in said matrix representing the heat generated by a portion of said target area,
a movable component for directing the heat from the target area to the thermal sensor to generate a plurality of copies of the dot matrix corresponding to a plurality of positions of the movable component,
processing means for analyzing a value acquired through a physical quantity for dots of said matrix in order to detect at least one piece of adjustment information that is representative of the position of said face within said target area,
wherein said thermal sensor has a given resolution and said processing means is configured to actuate said movable component so as to increase said given resolution based on the plurality of copies of the dot matrix.

2. The device as claimed in claim 1, wherein said matrix comprises n rows and m columns, defining n×m dots, n and/or m being strictly greater than 1 and less than or equal to 128.

3. The device as claimed in claim 2, wherein n and/or m are equal to 8 or 16.

4. The device as claimed in claim 1, wherein said thermal sensor is configured to be sensitive to radiation having a wavelength in the far infrared.

5. The device as claimed in claim 1, wherein said thermal sensor is configured to be sensitive to radiation having a wavelength of between 2 and 12 micrometers.

6. The device as claimed in claim 1, wherein said sensor is a thermopile.

7. A head-up display, said display being configured to display a virtual image at a given height, called the display height, said display including a device for detecting the position of the face as claimed in claim 1.

8. The display as claimed in claim 7, comprising means for changing said display height.

9. The display as claimed in claim 8, wherein said processing means is configured to actuate said means for changing the display height, as a function of said adjustment information.

10. The display as claimed in claim 8, comprising an optical system for transmitting rays for displaying said virtual image and wherein said means for changing the display height comprises the movable component of said optical system.

11. The display as claimed in claim 10, wherein said movable component is a mirror and/or a semi-reflective plate.

12. The display as claimed in claim 10, wherein said processing means is configured to actuate said movable component during a step of determining said adjustment value to increase said given resolution.

13. The display as claimed in claim 10, wherein said thermal sensor is positioned and said optical system is configured so that said rays follow an optical path which is different to a trajectory followed by the radiation received by said sensor from said motor vehicle driver.

14. The display as claimed in claim 10, further comprising an optical element for changing the optical path followed by said rays while leaving unchanged a trajectory followed by the radiation received by said sensor from said motor vehicle driver.

15. A method for detecting a position of a face of a motor vehicle driver, said method comprising:
determining, using a thermal sensor having a given resolution, heat generated from a target area likely to be occupied by the motor vehicle driver, in a form of a dot matrix, each dot in said matrix representing the heat generated by a portion of said target area;
actuating a movable component to direct the heat from the target area to the thermal sensor to generate a plurality of copies of the dot matrix corresponding to a plurality of positions of the movable component so as to increase said given resolution based on the plurality of copies of the dot matrix; and
analyzing a value acquired through a physical quantity for dots of said matrix in order to detect at least one piece of adjustment information that is representative of the position of said face within said target area.

* * * * *